United States Patent [19]
Gigliello et al.

[11] 3,920,549
[45] Nov. 18, 1975

[54] METHOD AND APPARATUS FOR MULTIPHASE FLUID COLLECTION AND SEPARATION

[75] Inventors: Joseph F. Gigliello; Harry A. Kragle, both of Corning, N.Y.

[73] Assignee: Corning Glass Works, Corning, N.Y.

[22] Filed: Mar. 18, 1974

[21] Appl. No.: 452,059

[52] U.S. Cl. ............ 210/83; 210/516; 210/DIG. 23
[51] Int. Cl.². ........................................ B01D 21/26
[58] Field of Search ...... 23/23 OB, 258.5, 259, 292; 128/2 F, 214 R, 218 M, 272, DIG. 5; 210/83, 84, 359, 456, 514–518, DIG. 23, DIG. 24; 233/1 A, 1 R, 26

[56] References Cited
UNITED STATES PATENTS

| | | | |
|---|---|---|---|
| 3,508,653 | 4/1970 | Coleman | 210/DIG. 24 |
| 3,780,935 | 12/1973 | Lukacs et al. | 210/DIG. 23 |
| 3,852,194 | 12/1974 | Zine, Jr. | 210/DIG. 23 |

*Primary Examiner*—John Adee
*Assistant Examiner*—Robert G. Mukai
*Attorney, Agent, or Firm*—Thomas J. McNaughton; Burton R. Turner; Clarence R. Patty, Jr.

[57] ABSTRACT

A multiphase fluid collection and separation assembly including a container, means for closuring the open end of the container, a gel-like material having a specific gravity greater than at least one phase of the multiphase fluid to be separated, and an energizer member having a specific gravity greater than that of the gel-like material. The energizer member may be shaped to mate with a portion of the bottom end of the container and is dimensioned to permit the flow of the gel-like material between its outer surface and the inner surface of the container wall. The energizer member may be hollowed and may be provided with a plurality of longitudinally-oriented equally-spaced-apart ridges. A method of automatically separating and partitioning two differing-density phases of a multiphase fluid, is also disclosed; the method includes the steps of partially submerging the energizer member in the gel-like material, thereby maintaining the gel-like material in its initial position, and thereafter, initiating and controlling the flow of the gel-like material by moving the energizer against the gel-like material in response to the application of a centrifugal force.

10 Claims, 11 Drawing Figures

METHOD AND APPARATUS FOR MULTIPHASE FLUID COLLECTION AND SEPARATION

BACKGROUND OF THE INVENTION

1. Field of the Invention

This invention relates to method and apparatus for the collection, centrifugal separation, and physical and chemical partitioning of a multiphase fluid, and more particularly, to the use of an energizer member within a gel-type multiphase fluid collection and separation assembly.

The invention is described in connection with the collection and separation assemblies and methods of the type shown and described in U.S. Pat. Application Ser. No. 314,270 filed Dec. 11, 1972, now U.S. Pat. No. 3,852,194 and also assigned to the assignee of this invention, although not restricted thereto.

2. Prior Art

In the standard evacuated blood sampling tubes, such as the system illustrated in U.S. Pat. No. 2,460,641 to Kleiner, a glass tube has one permanently closed end and the other end is closed by a rubber stopper having a pair of opposite top and bottom axial recesses separated by an intermediate diaphragm. A cup-like holder having a double ended hollow needle is used to obtain blood from a patient. An outer needle end is injected into the patient's vein and then, by forward thrust on the tube, the puncturing of the stopper diaphragm is completed by the inner needle to withdraw the blood. When the desired quantity of blood has been collected in the tube, the filled tube is removed from the cup-like holder, thereby obtaining a stopper-sealed collection tube housing a blood sample.

Blood or another fluid collected in the previously-described collection device is then generally taken to the laboratory for processing. The contents may be utilized as whole blood or separated into a lighter phase (serum or plasma) and a heavier phase (clot or red cells). If, for example, it is desired to obtain blood serum, after an initial time period during which the filled tube assembly is allowed to stand, the filled tube assembly is placed into a centrifuge. Upon subjection to a centrifugal force, the differing-density phases of the blood sample separate from one another: disposed at the bottom end of the tube will be a heavier phase consisting essentially of packed red cells; and at the upper part of the tube will be a lighter phase or low density portion of the fluid consisting essentially of blood serum or plasma. The separated serum is then analyzed, generally after first being removed from the tube assembly by decanting and/or syphoning.

U.S. Pat. No. 3,852,194 sets forth a method and apparatus for blood collection and partitioning which uses a gel-like material as a partitioning member, with this gel-like material preferably being hydrophobic, substantially thixotropic and generally inert to the separated fluid phases that are to be partitioned. This gel-like material, such as a mixture of silicone fluid and hydrophobic silicone dioxide powder, has a specific gravity intermediate those of the aforementioned differing-density phases of whole blood. Due to its specific gravity, the gel-like material is adapted to move within the container in response to centrifugation, and to stop moving when it reaches the vicinity of the fluid phase interface, that is, between the red cell phase and the serum or plasma phase. The gel-like material makes a transversely-continuous, semi-rigid, contact seal with an annular portion of the container inner surface, thereby effecting a seal that physically and chemically partitions the fluid phases of the blood.

One operational sequence of U.S. Pat. No. 3,852,194 applies specifically to a fluid collection and partitioning assembly that is intended to remain closed and vacuum sealed from the time of manufacture through sampling, preparation and centrifugation of its contents until the lighter phase is removed after centrifugation, this being identified therein as the "closed system" sequence. According to this sequence the gel-like material is deposited on or near the bottom of the container of the fluid collection assembly; and due to its relative specific gravity, exertion of a centrifugal force causes the gel-like material to rise to the fluid-phase interface and across the interface to form a transversely continuous partitioning member.

U.S. Pat. No. 3,852,194 also describes an apparatus for fluid collection and partitioning which uses a spool member having a container-contacting outer surface and a central axial orifice, with the gel-like material making a transversely-continuous contact seal with a spool central axial orifice. The spool may be introduced into the collection tube after the fluid sample has been collected; or, in the closed system sequence, the spool and gel-like material are both located in the sealed, closed, fluid receiving container, into which the multiphase fluid sample is thereafter introduced.

The present invention is designed to improve the operation of the apparatus and method for fluid collection and partitioning as set forth in U.S. Pat. No. 3,852,194. That is, during shipping and handling prior to use, the gel-like material in the closed system tube assembly has a tendency to move from its initial location near the closed end of the tube assembly. Movement toward the eventual fluid-phase interface is undesirable because, upon centrifugation, the displaced gel-like material will form a transversely continuous, flexible member generally before, rather than after, the phases of the fluid have separated. That is, the inherent characteristics of the gel-like material to meter its own flow will be impaired by the movement of the gel-like material from its predetermined position adjacent the bottom end of the container. Further the aforementioned system relies on the specific gravity differentials created during centrifugation to move the gel-like material to the red cell/serum interface. However, the gel-like material at rest at the bottom of the tube has a tendency to remain at rest in contradiction to its expected behavior in response to a centrifugal force. In addition it has been found that a substantial portion of gel-like material remains at the closed bottom end of the tube assembly after centrifugation, thus resulting in a waste of the gel-like material, and accordingly necessitating the utilization of greater amounts of gel-like material in order to perfect a transversely-continuous barrier at the red cell/serum interface. The present invention provides improved method and apparatus for overcoming these problems and producing greater efficiency in fluid separation system.

The use of silicone-based fluids for centrifugal fractionating of blood samples is well known and is set forth in articles by Morgan, M. C. and Szafir, J. J. in *Blood*, 1961, 18:89–94; by Seal, S. H., in *Cancer*, 1959, 12:590–595; and by McCrea, L. E. in *J. of Urol.*, 1961, 85:1006–1010. These articles basically describe the use of silicone fluids (blended to specific gravities intermediate those of the two or more phases sought to be separated) to isolate separated phases of blood samples, with the silicone fluid, upon centrifugation, forming a fluid barrier between the separated two phases. The techniques described in these articles call for the insertion of a fluid partitioning medium after, rather than before, the blood has been withdrawn from the patient and after the stopper has been removed from the filled collection assembly; and as such, they do not involve the problems associated with the movement of the partitioning material during storage or shipment and the initiation and control of flow of the partitioning material during centrifugation.

Another problem encountered with the prior art blood separation methods and apparatuses concerns lactic dehydrogenase (LDH) pollution of the serum or plasma phase of separated blood. Hemolysis or rupturing of red cells produces, among other substances, LDH. Since the presence of LDH artificially induced during the preparation of a sample adversely affects the testing quality of the serum, it is essential that rupturing of red cells be minimized. In the method and apparatus of the aforementioned Application, the partially clotted red cell phase, is centrifugally forced against the gel-like material initially positioned between it and the bottom end of the tube; and also the gel-like material, due to its lower specific gravity, is concurrently being centrifugally forced toward the red cell/serum interface against the red cell mass. These counteracting forces naturally tend to cause some rupturing or lysing of the red cells. To reduce the impact of the collision of these two masses in the "closed system" sequence therein, the gel-like material may be positioned asymmetrically toward a side of the container in order to reduce the mass or bolus of gel-like material which will be caught under the partially clotted red cell mass. This positioning, although reducing the likelihood of LDH pollution, results in difficulties relative to maintaining the positionment of the gel-like material during storage and handling as well as controlling its flow during centrifugation. However, the present invention provides novel means and procedures for overcoming such problems.

Another method and apparatus for separating a sample of whole blood is shown in U.S. Pat. No. 3,780,935. Therein separation is accomplished by inserting a dispensing device containing a sealant into a tube already containing whole blood sample. The sealant, consisting essentially of a silicone fluid and silica dispersed therein, is dispensed through the device's nozzle portion which extends into the sample. The method and apparatus therein do not provide for positioning of the sealant at the bottom of an evacuated and stoppered assembly, and, as such, do not involve the aforementioned problems pertaining to maintaining the partitioning medium at its predetermined position within the closed system blood collection and separation assembly, or to initiating and directing the flow of the partitioning medium from such position. The multiphase fluid collection and partitioning assembly of the present invention not only obviates the problems relating to the flow of the gel-like material before and during centrifugation, but also provides an assembly appearance which conveys an image of competence and cosmetic attractiveness.

SUMMARY OF THE INVENTION

The present invention relates to a multiphase fluid collection and partitioning assembly including a container, means for closuring the open end of the container, a predetermined amount of gel-like material, and an energizer member. The gel-like material is substantially non-flowable at rest, is noninteractive with the fluid phases sought to be separated, and has a specific gravity (or density) intermediate between those of the two fluid phases sought to be separated. The gel-like material is initially positioned adjacent the bottom end of the container. The energizer member is composed of a solid material having a specific gravity in excess of the specific gravity of the gel-like material. Preferably, the energizer member is dimensioned to mate with a portion of the bottom end of a container and to permit the flow of the gel-like material between its outer surface and the inner surface of the wall of the container.

In a preferred embodiment, the energizer member is provided with an uppermost surface having a hollow or cavity therein, the cavity preferably being of the same general shape as the outer surface of the energizer. The energizer may be provided with an upper portion having a plurality of equally-spaced-apart, longitudinally-oriented ridges. In operation, the energizer member is preferably initially partially submerged within the gel-like material, so as to restrain the movement of the gel-like material during shipping and handling.

After the introduction of a multiphase fluid into the assembly, the filled assembly is subjected to a centrifugal force, whereupon the energizer member, in exerting shear forces on the gel-like material, initiates the flow of the gel-like material. Thereafter, the energizer member directs the flow of the gel-like material along the inner wall of the container and meters such flow so that the gel-like material forms a transversely continuous flexible partitioning member between the two phases sought to be separated, generally after separation has occurred.

The energizer member of this invention may also be used in combination with the gel-like material and a spool member having a container-contacting outer surface portion and a central axial orifice. The spool member, is preferably initially positioned below the container stopper or closure, and above the energizer member. By having a specific gravity that is intermediate those of the separated fluid phases, the spool is adapted to move downwardly within the container in response to centrifugal force. The fluid phases flow freely only through the spool central axial orifice, with the spool being adapted to stop moving downwardly when it reaches the vicinity of the fluid phase interface. The energizer member, below the spool, initiates and controls the flow of the gel-like material from its position adjacent the bottom end of the container toward the fluid phase interface, with the gel-like material being adapted to make a transversely continuous semi-rigid contact seal with at least an annular surface portion of the spool central axial orifice.

The improved method of this invention includes the step of maintaining the gel-like material in a position adjacent the container bottom end by partially submerging an energizer member therewithin, and further includes the step of initiating and controlling the flow of the gel-like material by moving the energizer member against the gel-like material in response to the application of centrifugal force.

DESCRIPTION OF PREFERRED EMBODIMENTS

Figures 1, 2, 3, 4, 5, 6, 7:
FIG. 1 illustrates a collection and partitioning assembly embodying the present invention, ready for use in fluid collection, separation and partitioning, with the energizer member being initially partially submerged within the semi-rigid gel-like partitioning material.
FIG. 2 depicts the assembly of FIG. 1 after the introduction of a multiphase fluid.
FIG. 3 shows the assembly of FIG. 2 shortly after the subjection of the assembly to a centrifugal force, the gel-like material having been forced to flow between the inner surface of the wall of the container and the energizer member.
FIG. 4 illustrates the assembly of FIG. 3 after further centrifugation, the gel-like material having reached the interface between two substantially separated phases of the fluid sample, and also having transversed the fluid-phase interface to form a flexible barrier between said two phases.
FIG. 5 illustrates the assembly of FIG. 4 after termination of the application of the centrifugal force, the two differing-density phases being completely separated and the gel-like material having assumed a semi-rigid, transversely continuous contact partitioning or sealing member to thereby physically and chemically partition the two separated phases.
FIG. 6 illustrates another embodiment of the improved fluid collection and partitioning assemblies of this invention, having a spool poised beneath the closure member of the container and having an energizer member initially partially submerged within a gel-like material, with a differing density fluid being disposed between the spool and gel-like material.
FIG. 7 illustrates the assembly FIG. 6 upon completion of centrifugation, with the spool and gel-like material being located at the interface between the differing density fluid phases and coacting to constitute a transversely-continuous contact seal to thereby partition these phases.
Figure 8:
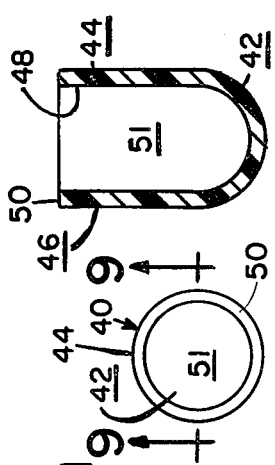
FIG. 8 is a top plan view of an energizer member of the present invention.

Referring now to the drawings in detail, FIG. 1 depicts a fluid collection and partitioning assembly 11 comprising a container 12, a predetermined amount of gel-like material 30, a stopper or closure 20, and an energizer member 40.

Container 12, which is preferably made of glass, has a normally closed bottom end 15 and an open upper end 16 for receiving a self-sealing stopper or closure 20 of any desired shape formed of medical grade butyl rubber or other suitable material. As shown, stopper 20 has a flanged end 22 which abuts and overlies an annular end face 18 of container open end 16. Stopper 20 is further provided with a diaphragm or septum portion 24 which forms a transversely continuous seal with a portion of inner surface 14 of container wall 13.

Stopper 20, together with collection tube 12, define a sealed closed, fluid receiving chamber 26. The stopper 20 is adapted to maintain a negative pressure (vacuum) of about 24 inches Hg for an extended period of time. Septum 24 is adapted to be easily pierced by a sampling needle so that the needle may reach chamber 26 and be removed therefrom without destroying the sealing integrity of the septum portion.

The gel-like material 30 may be of the type described in U.S. Pat. Application Ser. No. 314,270, filed Dec. 11, 1972; however, any gel-like material is useful in the context of this invention if it meets the following basic requirements:

1. Specific gravity (or density) intermediate those of the two fluid phases sought to be separated;
2. Non-interaction with the fluid phases sought to be separated; and
3. Substantially non-flowable (semi-rigid) at rest.

This gel-like material is preferably hydrophobic, substantially thixotropic, and generally inert to body fluids. In order to be utilized in a whole-blood separation system, the specific gravity of material 30 must be generally in the range of about 1.035 to about 1.06, with the preferred range being 1.04 through 1.055.

One example of such a gel-like material is a mixture of silicone fluid and very fine hydrophobic silicon dioxide powder. Hydrophobic silicon dioxide may be defined as silicon dioxide that is treated to repel water, with one example of a hydrophobic silicon dioxide powder being Silanox™ 101 (manufactured by the Cabot Corporation of Boston, Massachusetts and described in Cabot brochure SGEN-1) hydrophobic fumed silicon dioxide, which is a fumed silicon dioxide having trimethylsilyl groups bonded to the surface thereof. Another example of a hydrophobic silicon dioxide powder is AEROSIL R972 (sold by DEGUSSA INC. Pigments Div., New York, N.Y. and described in Technical Bulletin 31), wherein the silicon dioxide is rendered hydrophobic by reacting the silanol groups on the surface with dimethyl dichlorsilane.

Silicone fluid may be defined as a polysiloxane liquid such as for example DOW CORNING 360 Medical Fluid (a dimethyl polysiloxane liquid manufactured by the DOW CORNING corporation of Midland, Michigan and described in DOW CORNING Bulletins CPO-1072, March, 1972 and CPO-158-1, March 1972), Other examples of silicone fluids are DOW CORNING 200 and 510 (a methyl phenyl polysiloxane) fluids.

The following specific example of a gel-like material is given in illustration of the present invention and is not intended to be limiting on the invention.

One hundred grams of DOW CORNING 360 Medical Fluid (350 centistokes; specific gravity about 0.97) were mixed with 15.7 grams of Silanox™ 101 silane-modified silicon dioxide (specific gravity about 2.2) to produce 115.7 grams of a gel-like material having a specific gravity of about 1.05.

Table 1 illustrates among others, a number of mixtures of gel-like materials that may be utilized in this invention:

TABLE I

| Sample No. | Silicone | Viscosity (centistokes) | Grams of Silicone | Grams of S-101 | Grams of R-972 | Resulting S. G. |
|---|---|---|---|---|---|---|
| 2 | DC-360 | 100 | 100 | 3.0 | 16.0 | 1.059 |
| 8 | DC-510 | 100 | 100 | 11.0 | — | 1.047 |
| 10 | DC-510 | 100 | 100 | 10.0 | 2.0 | 1.053 |
| 11 | DC-510 | 100 | 100 | 9.5 | 2.5 | 1.053 |

TABLE I-continued

| Sample No. | Silicone | Viscosity (centistokes) | Grams of Silicone | Grams of S-101 | Grams of R-972 | Resulting S. G. |
|---|---|---|---|---|---|---|
| 12 | DC-510 | 100 | 100 | 9.0 | 3.0 | 1.053 |
| 13 | DC-360 | 100 | 100 | 2.0 | 15.0 | 1.050 |
| 14 | DC-360 | 100 | 100 | 4.0 | 13.0 | 1.050 |
| 24 | DC-360 | 350 | 100 | 1.0 | 15.0 | 1.051 |

DC-360 is DOW CORNING 360 Medical Fluid.
DC-510 is DOW CORNING 510 Fluid.
S-101 is Silanox™ 101 hydrophobic $SiO_2$.
R-972 is DEGUSSA R 972 hydrophobic $SiO_2$.

In the previously described examples, the silicone fluid may be thought of as a liquid or base material (an oil) and the silicon dioxide powder as a solid (a filler), with the latter serving both to increase or decrease the specific gravity of the composite material to the desired value and to gel the oil, i.e., to convert it into a semi-rigid gel-like material. As long as they meet the previously noted three basic requirements, almost any liquid and filler combination may be utilized, with examples of oils including esters of polyacids (such as dioctyl-sebacate, dibutylphthalate and tributylphosphate) and mineral oils (hydrocarbons). Examples of fillers include titania, zirconia, asbestos, wood flour and finely divided organic polymers (such as polyethylene, polyproplene, fluorocarbons and polyesters, etc.). Furthermore, again as long as the three basic requirements are met, the gel-like material may be made up of but a single component (such as a silicone) material or may be mixtures of one or more base materials and one or more fillers.

As illustrated in FIGS. 8–11, energizer member 40 may have a bottom end 42 shaped to generally mate with a portion of the closed end 15 of container 12 and an upper portion 46 which is dimensioned to permit the flow between the exterior surface 44 of the upper portion and the adjacent portion of container inner wall 13. When container 12 is in the form of a test-tube, the exterior surface 44 of energizer 40 may also be test-tube-shaped; that is, it may be spherical at its bottom portion 42 and cylindrical at its upper portion 46, with the outer diameter of said upper portion being less than the inner diameter of tube 12 to the extent that gel-like material 30 is permitted to flow therebetween.

Energizer member 40 may be hollowed in a manner that its inner surface 48 resembles outer surface 44.

That is, uppermost surface 50 may include a cavity or hollow 51 of the same shape as outer surface 44 of the energizer. The hollowing of the energizer permits the energizer to be seated in a partially submerged position within the gel by application of a centrifugal force, as will be discussed in more detail below. It should be noted that the relatively heavier bottom portion 42 of an energizer having a cavity 51 of the same shape as the energizer outer surface 46 will serve as a means of orienting the axis of the energizer at an attitude parallel to the axis of the container or tube 12, not only during the centrifugal positioning of the energizer, but also during the centrifugal separating of the fluid sample.

Figure 10:
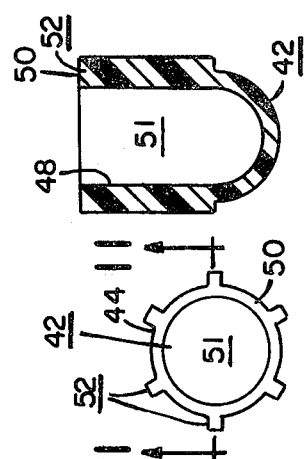
FIG. 10 is a top plan view of another embodiment of an energizer member of the invention.
Figure 9:
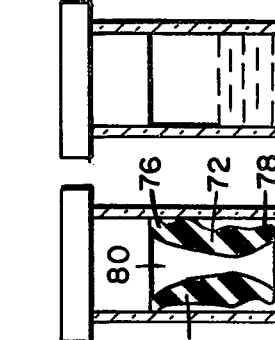
FIG. 9 is a sectional view in elevation taken along line 9—9 of FIG. 8.
Figure 11:
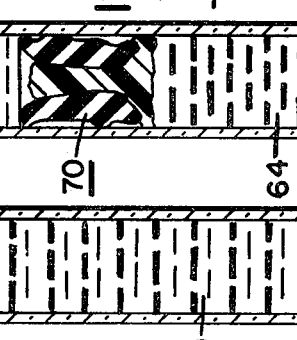
FIG. 11 is a sectional view in elevation taken along line 11—11 of FIG. 10.

As illustrated in FIGS. 10 and 11, a plurality of longitudinally-oriented ridges 52 may be formed on the upper portion 46 of energizer 40. These ridges may be equally spaced about the periphery of upper portion 46. Ridges 52 project outwardly from upper portion 46 to an extent such that, when the energizer forced into gel-like material 30 adjacent the tube bottom end 15, the ridges serve to maintain the annular surface portions of the exterior surface 44, between ridges 52, at a spaced distance from container wall inner surface 14. Ridges 52 thus serve to center energizer 40 within gel-like material 30 and to insure a generally even extrusion or expressed flow of gell-like material 30 upwardly about the periphery of energizer upper portion 46.

It will be appreciated that energizer 40 is designed to insure maximum utilization of gel-like material 30 during the centrifugation of assembly 11. During centrifugation, as will be described in detail below, energizer 40 moves downwardly toward tube bottom end 15; since energizer bottom portion 42 is shaped to generally mate with a portion of the inner surface of tube bottom portion 15, substantially all of the gel-like material 30, which is originally positioned adjacent tube bottom end 14, will be expressed out from under energizer 40 and upwardly along the inner surface of wall 13 of tube 12.

It will also be appreciated that energizers of other configurations embodying this invention will function to initiate the flow of gel-like material 30 from its original position adjacent tube bottom end 15. Generally any configuration, such as cubical, conical, spherical or cylindrical, will function to exert the shear forces required in initiating and controlling the flow of gel 30 without departing from the spirit and scope of the invention set forth herein. It is only necessary that the energizer be composed of a material inert to the fluids to be separated, have a specific gravity in excess of the specific gravity of gel-like material 30, and be of a configuration such that, upon subjection to a centrifugal force, the energizer will exert substantial shear forces upon gel-like material 30.

As shown in FIG. 1, energizer 40 may be partially submerged within gel-like material 30 prior to the introduction of a fluid sample. Energizer 40 may be pressed into such a position either by direct contacting means, such as a rod, or it may be forced into position by centrifugation. In the latter method of seating the energizer member, it is advantageous to employ a hollowed energizer member because the buoyancy of a properly hollowed energizer will cause the energizer to cease to further submerge when it attains a point of neutral buoyancy within the gel-like material. Accordingly, energizer member 40 may be provided with an uppermost surface 50 having a cavity 51. Cavity 51 should be of a predetermined volume such that, when the gel-like material 30 and energizer 40 within container 12 are subjected to a centrifugal force, the buoyant forces exerted by the gel-like material will maintain the energizer in a partially submerged position within the gel-like material.

The material used to construct energizer 40 must have a specific gravity in excess of the specific gravity of the gel-like material 30. By being even heavier than the gel-like material, the energizer 40 imparts energy, in the form of shear force, to the gel-like material 30 when all three basic components (the fluid, gel-like material and energizer) are subjected to a centrifugal force. Accordingly, an energizer composed of a plastic material with a specific gravity of approximately 1.2 or glass material with a specific gravity of approximately 2.0 will perform satisfactorily. Any solid material which is generally inert to the fluid phases sought to be separated and to the gel-like material and which has a specific gravity in excess of the specific gravity of the gel-like material is suitable for the purposes of this invention.

FIGS. 1 through 5 illustrate the operational sequence of the various parts of the preferred fluid collection and partitioning assembly. FIG. 1 depicts a preferred embodiment of an evacuated assembly 11 wherein the gel-like material 30 is positioned adjacent the closed end 15 of tube 12 and the energizer 40 is partially submerged therein. In this position, energizer member 40 serves as a means for restraining the gel-like material from flowing from its position adjacent bottom end 15 when the evacuated assembly 11 is being shipped or handled.

FIG. 2 depicts the FIG. 1 assembly with the addition of a multiphase fluid sample 34 to be separated, such as whole blood. After a correct venipuncture, a double-ended needle is pushed through stopper diaphragm 24, thereby permitting the vacuum within the assembly to draw blood into tube 12. The stopper reseals itself upon removing the needle therefrom, and after the customary waiting period, the assembly is inserted into a centrifuge. FIG. 3 illustrates the filled assembly of FIG. 2 shortly after the application of a centrifugal force. Fluid sample 34 has begun to separate into its component phases. A portion of a first heavier phase 64 has started to move toward tube bottom 15, and a portion of a second lighter phase 62 thereof has moved into the upper portion of the tube.

It will be appreciated that when blood is the fluid being collected and separated, coagulation of the blood will start to occur immediately upon contacting the material of tube 12, assuming the material to be glass or another clot-promoting container material. More specifically, the inactive Hagemann Factor (XII), which is present in the plasma of shed blood, will be activated by glass surface 14, thus initiating or contributing to the cascade type of sequence of reactions involved in the conversion of fibrinogen to fibrin. If the collected blood is allowed to rest in the glass tube without centrifugation, eventually a dense clot will form in the tube. It has been observed that this dense clot will eventually retract away from the container wall, and a lighter phase of blood, composed essentially of serum, will surround this clotted portion.

Due to different biological traits, all specimens of blood will not coagulate at the same rate. Some specimens have been observed to coagulate so rapidly that the aforementioned retraction phenomenon can present a substantial problem; the densely clotted portion of a pre-centrifuged sample may collide with the gel-like material during centrifugation in a manner that causes lysing or rupturing of the red cells entrapped in the relatively densely clotted portion. As illustrated in FIG. 3, however, the energizer of the present invention controls the flow of the gel-like material, causing it to flow through the periphery of the blood sample and generally along portions of the tube inner surface 14, thus reducing the possibility of collision with more densely clotted blood.

By treating inner surface 14 with a suitable lubricant, such as a polyethylene oxide polymer to prevent the adhesion of components of blood thereto, and by using an energizer to force the gel-like material to flow against the treated inner surface 14, the possibilities of the rupturing of red cells due to the collision of the gel-like material and red cells is significantly reduced. If the inner surface 14 of the tube 12 was not treated to prevent adhesion, some portion of the blood sample may adhere to such surface; and even though the partially clotted blood in the peripheral area of the sample is resilient and permits the gel to flow therethrough, nevertheless, there would be a significantly greater chance of rupturing red cells due to the collision of the gel-like material and those red cells that are relatively immobilized in that portion of the partially clotted blood which has adhered to the surface of the tube. Thus, it will be appreciated that the energizer 40 causes the gel-like material 30 to flow or slide between the treated inner surface 14 of the tube and the non-adhering partially clotted blood sample 64, thereby even further reducing the likelihood of hemolysis.

FIG. 4 depicts that phase of the automatic separation and partitioning sequence wherein a portion of the gel-like material 30 has ascended up the tube inner surface 14 to the position of the fluid-phase interface and has flowed inwardly at the fluid-phase interface to form a flexible partition between the lighter phase 62, which is comprised essentially of serum or plasma, and a heavier phase 64, which is comprised essentially of red cells and fibrin. Each phase of the fluid sample 60 and the majority of the gel-like material has reached a level equivalent to their own specific gravities. Thus, between the stages of separation depicted in FIGS. 2 and 4, the subjection of assembly 11 to a centrifugal force brings about the following results: centrifugal force impels or sediments the heavier phase 64 of fluid sample 60 toward container bottom end 15; the centrifugal force, together with the weight of the heavier phase 64, force energizer 40 toward container bottom 15; hydrodynamic or buoyant forces and the shear forces exerted by energizer 40 impel gel-like material 30 toward stopper 20 through the periphery of the fluid 60 to the position of the interface between phases 62 and 64. By carefully controlling the specific gravity, viscosity, and thixotropy of gel-like material 30 and the weight and configuration of energizer 40, the gel-like material 30 will completely transverse the interface between the heavier and light phases generally after the fluid phases 62 and 64 have completely separated. However, due to the fluid-nature and resiliency of the gel-like material, any portion of heavier phase 64 still remaining with lighter phase 62 after the gel-like material has completely transversed the bore of the tube may nevertheless penetrate the gel-like material, without destroying the integrity of the gel-like material. Also, any portion of lighter phase 62 will rise through gel-like material 30 in the position shown in FIG. 4.

FIG. 5 demonstrates the assembly of FIG. 4 upon the completion of centrifugation, that is, after the termination of the applied centrifugal force wherein all parts are in their final positions. The fluid phases, the gel-like material, and the energizer member each reach a level equivalent to its own specific gravity prior to the termination of the applied force, and material 30 flattens out and consolidates so as to make a transversely-continuous, semirigid, contact seal or partitioning member 66 with a portion of container inner surface 14. It will be appreciated that although a small portion of the gel-like material 30 is shown remaining about the energizer 40 after centrifugation, substantially all of the material is utilized in forming partitioning member 66, since the energizer is forced into contact with the bottom of the tube during centrifugation, thereby expressing most of the gel-like material 30 up along the inner surface 14 of the tube 12.

FIGS. 6 and 7 disclose another embodiment of the present invention wherein a spool 70 is used in conjunction with gel-like material 30 to affect a complete physical and chemical partitioning of two differing-density fluid phases. Spool 70 has an annular, generally cylindrically-shaped main body portion 72 having a diameter less than the inside diameter of a test-tube-shaped container 12 and has an upper, outwardly-tapering, annular, resilient wiper or outer surface portion 76. Wiper 76 has a maximum outer free diameter greater than that of portion 72, with portion 76 being adapted to sealingly contact container inner wall surface 14. Spool 70 also has a lower skirt portion 78 and a central axial orifice 80. Spool 70 may be of the type disclosed in copending U.S. patent application Ser. No. 228,573 filed Feb. 23, 1972, now U.S. Pat. No. 3,814,248 (which is a continuation in part of application Ser. No. 178,274 filed Sept. 7, 1971, now abandoned) and is also assigned to the assignee of this invention.

With reference to the operational sequence illustrated in FIGS. 6 and 7, FIG. 6 shows the fluid collection and partitioning assembly immediately prior to centrifugation. During centrifugation, gel-like material 30 behaves in the manner already described with reference to FIGS. 3-5, except that material 30 coacts with spool 70 to establish a transversely-continuous seal to separate phases 62 and 64. Spool 70, which is preferably made of a resilient material such as medical grade rubber, has a specific gravity intermediate those of the fluid phases to be separated (in the case of human blood the intermediate specific gravity of the spool would be between 1.035 and 1.06). At the start of centrifugation, spool 70, because of its specific gravity, starts to move downwardly away from the vicinity of stopper 20 toward lighter phase 62, which in turn flows upwardly through spool central axial orifice 80. It should be noted that all fluid flow takes place through orifice 80 and no fluid is permitted between the outer surface of spool 70 and tubular surface 13.

After the termination of the centrifugal force, as shown in FIG. 7, shirt portion 78 of spool 70 has entered heavier phase 64; and gel-like material 30, again as a result of the applied centrifugal force and the shear forces exerted by energizer member 40, has entered lighter phase 62 by extending at least partially through spool central axial orifice 80. Gel-like material 30 is adapted to make a transversely-continuous contact seal member with at least an annular portion of orifice 80. Spool 70 together with gel-like material 30 forms a transversely-continuous partitioning assembly with an annular surface portion of container inner surface 14. Final sealing is accomplished within spool central axial orifice 80 due to the action of gel-like material 30 and is purposefully designed to occur at or just above the fluid phase interface to insure the absence of any heavy phase components within the lighter phase sample.

The present invention sets forth an improvement in the art of fluid collection and separation by providing method and apparatus for maintaining a partitioning gel-like material in its initial position within a container, and for facilitating movement of such material during a centrifugal separating and partitioning step. The present method includes a step of partially submerging an energizer member in the gel-like material, thus serving to maintain the gel-like material in its initial position adjacent the container bottom end. Further steps provide for initiating and controlling the flow of the gel-like material, from its initial position, by centrifugally forcing the energizer member downwardly into said gel-like material until the phases of the multiphase fluid have separated and until substantially all of the gel-like material has ascended to the position of the fluid-phase interface.

Although the operating parameters will vary widely according to characteristics of the multiphase fluid and of the gel-like material, the following specific example is given by way of illustration of the improved method of the present invention and is not intended to be limiting of the invention. The gel-like material used in this example was a silicone fluid and silicate filler mixed together to form a thixotropic gel having a density of approximately 1.045 grams per cubic centimeter. The viscosity of this gel-like material was measured in a Brookfield Viscometer; its viscosity was approximately 350,000 at 1 revolutions per minute and approximately 65,000 at 10 revolutions per minute. Thus, the index of thixotropy for this particular mixture was approximately 5.43.

This gel-like material was then deposited at the bottom of a standard sample tube having an inner diameter of 0.521 inches. An energizer member of the type illustrated in FIGS. 8 and 9 was partially submerged by centrifugation into the gel-like material. The energizer member was composed of acrylic plastic having a density of 1.19 grams per cubic centimeter and had an outer diameter of 0.500 inches.

The tube was then evacuated and stoppered. In this condition the closed system blood collection and separation assembly was ready for shipment and storage, with the gel-like material being maintained in place at the bottom of the tube by the energizer member. The evacuated assembly was next used to withdraw a whole blood specimen. After a short period to allow for coagulation, the filled and stoppered tube was centrifuged at 1100 G's for approximately 10 minutes. Upon centrifugation, the energizer member was centrifugally forced into the gel-like material, thereby initiating and directing the flow of the gel-like material through the annular space between the energizer member and portions of the tube wall inner surface. The red cell or clot phase was centrifugally forced toward the energizer member, thereby urging the gel-like material along the tube wall inner surface to the position of the cell-serum interface, whereat the gel-like material formed a transversely continuous partitioning member. Upon termination of centrifugation, the gel-like material flattened out and restored itself quickly to its original high-viscosity state, thus forming a continuous seal with the surrounding tube wall inner surface.

Since the original stopper was still securely in place, it was possible to store the separated and partitioned sample without further manipulation of the assembly. After removal of the stopper, the serum was simply poured from the tube.

The principles of this invention may be utilized in partitioning assemblies for fluids other than human blood. The energizer member may be used in any container and partitioning assembly utilizing centrifugation for the isolation of at least two differing-density fluid or semifluid phases from a flowable sample wherein a gel-like partitioning material having a specific gravity intermediate those of the phases sought to be separated is utilized.

It is intended that the above-described forms or embodiments should be construed as illustrative of a preferred multiphase fluid collection and separation assembly and of a method of automatically separating and partitioning differing-density phases of multiphase fluids. Accordingly, it is intended that the scope of the disclosed invention should be limited only by the appended claims.

We claim:

1. An apparatus for collecting a multiphase fluid such as blood and for separating and partitioning said fluid into a lighter phase and a heavier phase comprising:
   a. a container having an open end and a closed end;
   b. gel-like material initially positioned adjacent said container closed end, said gel-like material being thixotropic and chemically inert to the lighter and heavier phases and having a specific gravity between the specific gravities of said heavier and lighter phases; and
   c. energizer means having wall portions initially partially submerged in said gel-like material for maintaining the gel-like material in said initial position prior to centrifugation and constructed and arranged for influencing said gel-like material to flow, under the influence of centrifugal force, along wall portions of said container, and said energizer means having a specific gravity greater than the specific gravity of said gel-like material and being positioned with at least some wall portions thereof in spaced-apart relationship from wall portions of said container.

2. The apparatus of claim 1 wherein said energizer member includes an uppermost surface having a cavity of sufficient volume to permit the energizer member to be bouyantly submerged within said gel-like material, said cavity opening in the direction of said container open end to receive said multiphase fluid.

3. The apparatus of claim 1 wherein the specific gravity of said energizer means is greater than that of said heavier phase.

4. The apparatus of claim 1 wherein said container and said energizer member are test-tube-shaped.

5. The apparatus of claim 4 wherein the upper portion of said test-tube-shaped energizer member includes an uppermost surface having a cavity of sufficient volume to permit said energizer member to be buoyantly submerged within said gel-like material, said cavity opening in the direction of said container open end to receive the weight of said heavier phase during centrifugation of the fluid.

6. The apparatus of claim 1 wherein said energizer means comprises a member having upper and lower portions, said upper portion having sidewall portions of the same general shape as said container wall portions and having outer dimensions to permit said gel-like material to flow between said container wall portions and sidewall portions of said energizer member upper portion, and said energizer member lower portion being of a shape to substantially mate with a portion of said container closed end.

7. The apparatus of claim 6 wherein said energizer upper portion includes ridge means for maintaining wall portions of said energizer member upper portion in a spaced-apart relationship from the inner surface of said container wall portions.

8. A method of centrifugally separating blood into a serum phase and a clotted red cell phase within a container provided with gel-like material and an energizer member constructed and arranged to facilitate movement of said gel-like material upon application of centrifugal force; comprising the steps of providing an inner bottom portion of a container with a chemically inert, thixotropic gel-like material having a specific gravity between the specific gravities of the clotted red cell phase and the serum phase; positioning an energizer member having a specific gravity greater than that of said gel-like material within a surface portion of said gel-like material and with at least some wall portions thereof in spaced-apart relationship from wall portions of said container; supplying the container with blood; coagulating the blood to form a clotted red cell phase and a serum phase; applying centrifugal force to move both the clotted red cell phase and said energizer member toward said container bottom, and through the movement of said energizer member to facilitate movement of said gel-like material between said energizer member and said container wall portions upwardly along wall portions of said container to a position between the clotted red cell phase and the serum phase; and continuing to apply centrifugal force to completely separate the clotted red cell and serum phases and to form a transversely continuous barrier of gel-like material between said separated phases.

9. A method of separating and partitioning a multiphase fluid into a lighter first phase and a heavier second phase within a container having gel-like material and energizer means having walls and being constructed and arranged for promoting the flow of said gel-like material from an end portion of said container during centrifugation, comprising the steps of depositing chemically inert, thixotropic gel-like material having a specific gravity intermediate the specific gravities of said phases at a first position within said container adjacent said end portion, partially submerging the energizer means within said gel-like material and with portions of the walls thereof in spaced-apart relationship from sidewall portions of said container for maintaining said gel-like material at said first position, said energizer means further having a specific gravity greater than the specific gravity of said gel-like material, providing said container with said multiphase fluid, centrifugally forcing said energizer means into said gel-like material for initiating and directing the flow of said gel-like material between said energizer means and sidewall portions of said container, and centrifugally forcing said second phase toward said energizer means to separate said second phase from said first phase and to urge a substantial portion of said gel-like material from said initial position and along sidewall portions of said container to a second position between said fluid and second phases of said multiphase fluid.

10. A method of collecting blood and separating and partitioning the blood into a clotted red cell phase and a serum phase within a container having gel-like material and an energizer member constructed and arranged to displace said gel-like material from an end portion of said container upon centrifugation, comprising the steps of initially positioning chemically inert, thixotropic gel-like material having a specific gravity between that of said phases at a first position within said container adjacent said end portion, partially submerging an energizer member within the gel-like material with wall portions thereof in a spaced-apart relationship from sidewall portions of said container for maintaining the gel-like material at said initial position, evacuating and sealing the container, supplying the container with blood, coagulating the blood to form a clotted red cell phase and a serum phase, centrifugally forcing the energizer member into the gel-like material to displace a substantial portion of the gel-like material along sidewall portions of said container, centrifugally separating the clotted red cell and serum phases, and flowing the gel-like material to a second position between the red cell and serum phases to form a transversely continuous partition of gel-like material between the clotted red cell and serum phases.

* * * * *